United States Patent

[11] 3,622,641

| [72] | Inventor | James Walter Crary |
| | | Wilmington, Del. |
| [21] | Appl. No. | 712,897 |
| [22] | Filed | Feb. 28, 1968 |
| [45] | Patented | Nov. 23, 1971 |
| [73] | Assignee | E. I. du Pont de Nemours and Company |
| | | Wilmington, Del. |

[54] DEHYDROHALOGENATION OF HALOGENATED COMPOUNDS
9 Claims, No Drawings

[52] U.S. Cl. .................................................. 260/655,
260/654 D
[51] Int. Cl. ....................................................... C07c 21/20
[50] Field of Search ........................................... 260/655,
654 D; 252/426

[56] References Cited
UNITED STATES PATENTS

| 2,322,258 | 6/1943 | Strosacker et al. ........... | 260/654 |
| 2,430,016 | 11/1947 | Hearne et al. ................ | 260/655 |
| 2,543,648 | 2/1951 | Strosacker et al. ........... | 260/654 |
| 2,999,888 | 9/1961 | Crocker et al. ............... | 260/655 |

FOREIGN PATENTS

| 1,440,716 | 4/1966 | France ......................... | 260/340.3 |

*Primary Examiner*—Bernard Helfin
*Assistant Examiner*—Joseph A. Boska
*Attorney*—Fred C. Carlson

ABSTRACT: Halogen-containing organic compounds are treated with aqueous inorganic alkaline material in the presence of a catalytic amount of cyclic polyether to split off hydrogen halide.

DEHYDROHALOGENATION OF HALOGENATED COMPOUNDS

BACKGROUND OF THE INVENTION

It is known to dehydrohalogenate halogen-containing compounds by reaction with aqueous alkali. Chloroprene (2-chloro-1,3-butadiene) can conventionally be prepared by dehydrochlorinating 3,4-dichloro-1-butene with an aqueous alkaline solution such as aqueous sodium hydroxide or potassium hydroxide. Such a procedure is disclosed in U.S. Pat. No. 2,430,016. However, these processes are characterized by relatively low reaction rates, and there has been a need for a dehydrohalogenation process with a much faster reaction rate than has heretofore been available.

DESCRIPTION OF THE INVENTION

In accordance with this invention there is provided an improvement in the aqueous process for dehydrohalogenating a halogenated aliphatic hydrocarbon containing at least two carbon atoms and one hydrogen atom. The process involves conducting the dehydrohalogenation by reaction with an inorganic alkaline material in aqueous medium in the presence of a catalytic amount of a cyclic polyether compound. Usually the amount of cyclic polyether compound will be about 1–15 percent by weight based on the weight of the halogenated compound which is being dehydrohalogenated. By operating in accordance with the present invention very substantial increases in reaction rate are obtained as well as a reduction in the percentage of unwanted byproducts, such as 1-chloro-1,3-butadiene when 3,4-dichloro-1-butene is dehydrohalogenated.

At least about 1 percent of the cyclic polyether catalyst based on the weight of the halogenated compound is required to produce a significant increase in reaction rate. The preferred amount of catalyst is between 1.5 and about 10 percent. Above about 15 percent catalyst is undesirable because of economics and the need to recover the catalyst for reuse.

The cyclic polyethers which can be utilized in the invention process are represented by the structure:

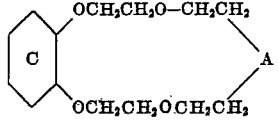

wherein ring C is benzenoid or an alicyclic ring and A is an oxygen atom or

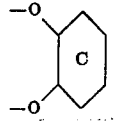

with the proviso that both rings C can be substituted with lower alkyl radicals of from one to four carbons. Mixtures can be used.

The compounds to be used as catalysts in practicing this invention can be prepared by reacting catechol (o-dihydroxybenzene) or a lower-alkyl-substituted catechol with the appropriate compound containing two terminal halogen atoms, preferably chlorine. When A is oxygen, the chlorine-containing reactant used is Cl—CH$_2$CH$_2$O—CH$_2$CH$_2$—O—CH$_2$CH$_2$—OCH$_2$CH$_2$—Cl, that is bis[2-(2-chloroethoxy)ethyl] ether or, named in another way, 1,11-dichloro-3,6,9-trioxaundecane. When said A is

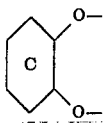

the halogen-containing reactant is bis(2-chloroethyl) ether. The reaction is carried out in the presence of at least one equivalent of a strong base, preferably sodium hydroxide, for each phenolic hydroxyl group. Generally, the compounds are prepared in the presence of a solvent which will dissolve both the basic reagent and the organic reactants. Suitable solvents include mixtures of water and butyl alcohol, lower alkyl ethers of ethylene glycol, and dioxane. The preferred reaction temperatures are from about 90° to about 140° C. The required reaction time will vary, but may range from about 6 to about 24 hours. The products are isolated by conventional methods such as by concentration of the reaction mixture or mechanical collection of insoluble or precipitated product. The products can then be further purified by recrystallization from a suitable solvent.

The preparation of these compounds is described in French Pat. No. 1,440,716.

The compounds in which the rings are saturated are prepared from the corresponding aromatic compounds by catalytic hydrogenation of the ring. Suitable hydrogenation catalysts are ruthenium dioxide on alumina, platinum oxide and platinum on charcoal. The solvent can be any suitable hydrogenation solvent which will dissolve the ether compounds; an example is dioxane. Suitable temperatures and pressures are, respectively, 60°–120° C. and 500 to 2,000 p.s.i.g. Typical times required are from 3 to 20 hours. The desired products are isolated by conventional methods such as by fractional crystallization from solvents such as alcohol, chloroform, 2-ethoxyethanol, benzene, and heptane, or by chromatographic separation.

The corresponding compounds in which the ring is substituted with one or more lower alkyl radicals can be prepared by using the alkyl-substituted catechol as the starting phenolic reactant or by alkylating the aromatic ring or rings after the formation of the cyclic ether compounds containing the aromatic ring or rings. The alkyl-substituted compounds are then reduced using the procedure described above.

Examples of suitable polyether compounds are the following:

Aromatic compounds

A.

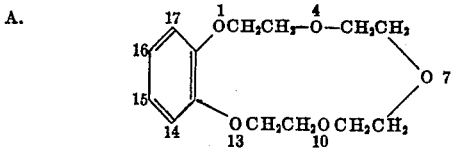

I 2,3-benzo-1,4,7,10,13-pentaoxacyclopentadec-2-ene
II 15-tert-butyl-1,4,7,10,13-pentaoxacyclopentadec-2-ene
III 14-methyl-1,4,7,10,13-pentaoxacyclopentadec-2-ene
IV 15-ethyl-1,4,7,10,13-pentaoxacyclopentadec-2-ene
V 14,15-dimethyl-1,4,7,10,13-pentaoxacyclopentadec-2-ene
VI 14,17-dipropyl-1,4,7,10,13-pentaoxacyclopentadec-2-ene
VII 15-butyl-1,4,7,10,13-pentaoxacyclopentadec-2-ene

B.

![structure B]

2,3,11,12-dibenzo-1,4,7,10,13,16-hexaoxacyclooctadeca-2,11-diene

Compounds in which one or more of the positions 8, 9, 10, 11, 19, 20, 21, or 22 are substituted with methyl, ethyl, propyl, isopropyl, butyl, sec-butyl, or tert-butyl radicals. C. Compounds prepared by hydrogenating the aromatic ring on any of the compounds of A and B above.

The temperature to be used in carrying out the process of this invention can vary from about 0° C. to at least about 100° C. At temperatures below about 0° C. the reaction is undesirably slow and temperatures substantially above 100° C. are undesirable because of increased problems of polymerization, byproduct formation, etc. The most practical temperature range is from about 40° to about 85° C. when 3,4- dichloro-1-butene is being dehydrohalogenated to chloroprene. It is most convenient to use the autogenous pressures which develop normally under the reaction conditions. Higher or lower pressures can be used if desired.

The reaction is carried out in the absence of oxygen to avoid subsequent reactions of the dehydrohalogenated product formed. Also, it is highly desirable to add polymerization inhibitors such as phenothiazine, alkyl nitrites, nitroso compounds or other compounds which inhibit polymer formation if the reactants or products are polymerizable.

The alkaline material used in the process of this invention can be any alkaline material which is capable of effecting a dehydrohalogenation by reaction with a halogenated compound in aqueous media. Alkali metal hydroxides are preferred in the carrying out of the process of this invention. Sodium hydroxide is particularly preferred because of its ready availability. Other hydroxides which can be used include potassium hydroxide, lithium hydroxide, rubidium hydroxide and cesium hydroxide. Alkaline earth metal hydroxides such as calcium and barium hydroxides can also be used.

The hydroxide is preferably used as an aqueous solution and the concentration of hydroxide in the solution may vary over a wide range for example from about 2 percent up to a saturated solution. The cyclic polyether catalysts are most effective at alkali metal hydroxide concentrations maintained from about 15 percent up to a saturated solution.

The mole ratio of hydroxide to halo-compound can be as low as about 0.5:1. The optimum mole ratio of reactants to use will vary with the effectiveness of the cyclic polyether compound being employed as catalyst and the reactivity of the compound being dehydrohalogenated. Within the mole ratio range of 0.5:1 to 20:1 the higher mole ratios are needed with the less active catalysts and reactants. The upper limit of mole ratio is not critical. In general, there is no advantage in using mole ratios above 20 to 1.

The process of this invention is generally applicable to the dehydrohalogenation of halogenated aliphatic hydrocarbons containing at least two carbon atoms and at least one hydrogen atom and is particularly useful for the preparation of chloroprene from 3,4-dichloro-1-butene and preparation of 2,3-dichloro-1,3-butadiene from 2,3,4-trichloro-1-butene or 1,2,3,4-tetrachlorobutane. Representative halogenated aliphatic hydrocarbons which can be dehydrohalogenated include chlorocyclohexene, chlorocyclohexane as well as the corresponding polychloro substituted cyclohexanes and cyclohexenes, tetrachlorobutene, ethyl chloride, dichloroethane, trichloroethane, tetrachloroethane and pentachloroethane, 1,4-dichloro2-butene, 2-chloro-1,3-butadiene, 1-chloro-1,3-butadiene, propyl chloride, butyl chloride, amyl chloride and the corresponding polychloro analogs of these compounds.

These compounds can be saturated or can contain one or more sites of nonaromatic unsaturation. Preferred are ethylenically unsaturated halogenated hydrocarbons such as 3,4-dichloro-1-butene in which the hydrogen which is to be removed by the dehydrohalogenation reaction is attached to the α-carbon atom relative to the double bond. Normally, the latter will involve the splitting off of a single HCl molecule.

The process can be carried out by either a batch or a continuous process. The product formed can be recovered by conventional techniques. In producing chloroprene the reaction mass can be removed as a liquid, the aqueous and organic phases can be separated by conventional methods, and the chloroprene can be separated from dichlorobutene by distillation. Other methods will be within the scope of one skilled in the art.

Although the invention is illustrated by the dehydrochlorination of chlorine-containing compounds for convenience and because these are the most readily available halogen compounds, it is equally useful for splitting off hydrogen bromide, hydrogen iodide and hydrogen fluoride from the corresponding bromine-, iodine- and fluorine-containing compounds.

The following examples are representative and illustrate the invention process. All parts, percentages and proportions are by weight unless otherwise indicated.

EXAMPLES 1 TO 6

A series of experiments is carried out using the following procedure and the conditions in table I.

The reactor is a flask fitted with an agitator, reflux condenser, and nitrogen inlet tube. Air is flushed from the flask with nitrogen. Sodium hydroxide solution and the catalyst are put into the flask, and the flask is heated to the desired reaction temperature. Stirring is stopped, and 3,4-dichloro-1-butene containing a small amount of phenothiazine (0.02–0.1 percent) is added to the flask through the top of the reflux condenser. Stirring is then resumed, and the desired temperature is maintained for the desired reaction time. (Timing of the reaction is measured from the resumption of stirring.) After the specified reaction time, stirring is stopped, and the flask is removed from the bath and its contents are diluted with cold water. The reaction mixture is extracted with a volume of toluene twice that of the dichlorobutene originally charged, and the organic layer is separated and analyzed by vapor phase chromatography. Area percent analyses are converted to mole percent values from predetermined calibrations. The formula for percent conversion of dichlorobutene is:

$$\text{Percent conversion} = \frac{\text{Moles of chloroprene} \times 100}{\text{Moles of chloroprene} + \text{moles of unreacted dichlorobutene}}$$

The 3,4-dichloro-1-butene used is 97–98 percent pure. Molar amounts are not corrected for impurities. The concentration of sodium hydroxide is based on weight of sodium hydroxide plus weight of water. The concentration shown in table I is that of the sodium hydroxide solution initially fed to the reactor. Percentage of catalyst is based on weight of 3,4-dichlorobutene (DCB). Table I summarizes the experiments and results.

The representative catalysts utilized in table I follow:
A. 2,3-Benzo-1,4,7,10,13-pentaoxacyclopentadec-2-ene having the structure

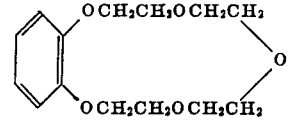

This compound is prepared as described in example 17, part A, of French Pat. No. 1,440,716.
B. 2,5,8,11,14-Pentaoxabicyclo(13.4.0) nonadecane This compound is produced by hydrogenating the ring in compound A above to give the following structure:

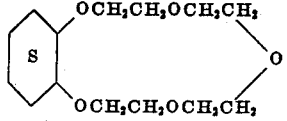

The hydrogenation procedure is as follows:
A 400 ml. stainless steel shaker bomb was charged at 25° C. with 180 ml. of p-dioxane, 26 g. (0.097 gram-mole) of 2,3-benzo-1,4,7,10,13-pentaoxacyclopentadec-2-ene, and 1.5 gram of ruthenium dioxide catalyst. After the bomb had been closed, the charge was hydrogenated while shaken at 90° C. and 1,600 lb./sq. in. (gauge) for 3 hours. The bomb was then discharged after cooling.

After the catalyst had been filtered off, the filtrate was concentrated in a rotary vacuum evaporator at 60° C. and 0.5 mm. Hg. The viscous residue weighing 25.1 g. was put on a 4.8×25 cm. column of acid-washed alumina and eluted with 400 ml. of petroleum ether (boiling point: 60° C./760 mm. Hg) and 400 ml. of benzene in turn. The combined elutes were concentrated in a rotary vacuum evaporator at 100° C. and 0.5 mm. Hg to give 2,5,8,11,14-pentaoxabicyclo(13.4.0) nonadecane as a colorless, viscous oil weighing 15.3 g. Yield: 57.5 percent.

C. 15-tert-butyl-2,3,-benzo-1,4,7,10,13-Pentaoxacyclopentadec 2-ene.

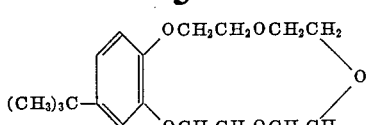

This compound is prepared as described in French Pat. No. 1,440,716, example 17, part B.

D. 17-Tert-butyl-2,5,8,11,14-pentaoxabicyclo(13.4.0)nonadecane

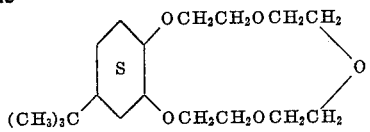

This compound is prepared by the hydrogenation of compound C above. The hydrogenation is carried out as follows:

A 1-liter stainless steel shaker bomb was charged with 450 ml. of p-dioxane, 53 g. (0.164 gram-mole) of 15-tert-butyl-2,3-benzo-1,4,7,10,13-pentaoxacyclopentadec-2-ene and 20 g. of 5 percent ruthenium on carbon. Hydrogenation was subsequently carried out for 19 hours while the bomb was shaken at 100° C. under a pressure of 1,600 p.s.i. (gauge).

After the contents of the bomb had been cooled to 25° C., they were removed and filtered. The catalyst-free filtrate was then concentrated in a rotary evaporator at 60° C. and 0.5 mm. Hg. The viscous residue obtained, weighing 48.1 g. was twice chromatographed on acid-washed alumina using n-heptane. The eluate, 11.7 g. of oil, was still contaminated with compounds containing a hydroxyl group. Eleven grams of this product were treated at 80° C. with 1 ml. of 2,4-toluene diisocyanate and three drops of triethylamine, warmed on a steambath, and then allowed to stand at 25° C. overnight. Five milliliters of water were added and the mixture stored for 2 days at 25° C. The resulting mixture was then dried in a rotary evaporator, taken up with 200 ml. of n-heptane, filtered to remove insoluble matter and the filtrate was concentrated in a rotary evaporator at 60° C. and 0.5 mm. Hg. The residue, 9.3 g. of nearly colorless oil, was the desired product 17-tert-butyl-2,5,8,11,14-pentaoxabicyclo(13.4.0)nonadecane. Yield 17 percent.

E. 2,5,8,15,18,21-hexaoxatricyclo(20.4.0.0$^{9.14}$)hexacosane

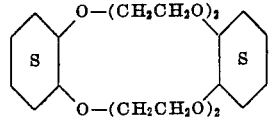

The preparation of the corresponding compound in which the rings are aromatic is described in example 5 of the French Pat. No. 1,440,716. The hydrogenation of the aromatic compound is conducted as follows:

A 1-liter stainless steel shaker bomb was charged at 25° C. with 650 ml. of p-dioxane, 60 g. of 2,3,11,12-dibenzo-1,4,7,10,13,16-hexaoxacyclooctadeca-2,11-diene and 5 g. of ruthenium dioxide catalyst. After the bomb had been closed and readied for hydrogenation, the internal temperature was raised to 100° C. and the charge was hydrogenated while shaken at 1,550 lb./sq.in. (gauge) for 5 hours. The bomb was then cooled and discharged.

The catalyst was removed by filtration. To keep it from heating up while air was being drawn through it, the catalyst was kept wet with water. Concentration of the filtrate in a rotary evaporator (0.5 mm. Hg at 60° C.) gave 59 grams of colorless, viscous residue. This material was passed through a 4.8×25 cm. column of acid-washed alumina that had been prepared with petroleum ether (boiling point 60° C./760 mm. Hg), and eluted with 860 ml. of n-heptane. When concentrated by evaporation, the eluate yielded 41.3 g. of 2,5,8,15,18,21-hexaoxatricyclo (20.4.0.0$^{9.14}$)hexacosane as a colorless, very viscous oil. Yield 66.7 percent.

Similarly effective results as achieved in the preceding representative examples are obtained on use of corresponding cyclic polyether catalysts encompassed by the generic structure heretofore set forth. Additional specific cyclic polyether catalysts include:

1. 2,3,11,12-dibenzo-1,4,7,10,13,16-hexaoxacyclooctadeca-2,11-diene
2. The di-tert-butyl derivative of compound (1) whose preparation is described in example 5, part B, of French Pat. No. 1,440,716.
3. The saturated compound prepared by reducing the rings of compound (2) above.

TABLE I

| Example | Catalyst | Catalyst conc. percent | Initial NaOH conc. percent | Mole ratio NaOH/DCB | Time, min. | Temp., ° C. | Conversion, mole percent |
|---|---|---|---|---|---|---|---|
| 1 | A | 8.7 | 25 | 10 | 20 | 50 | 31 |
| 2 | A | 1.7 | 50 | 8.4 | 10 | 50 | 29 |
| 3 | A | 8.7 | 50 | 8.4 | 20 | 50 | 97 |
| 4 | B | 1.7 | 50 | 8.4 | 10 | 50 | 30 |
| 5 | D | 1.7 | 50 | 8.4 | 10 | 50 | 39 |
| 6 | E | 8.7 | 50 | 8.4 | 20 | 50 | 27 |
| Comparison | None | 0 | 25 | 10 | 20 | 50 | 6 |
| Comparison | None | 0 | 50 | 10 | 30 | 60 | 3 |

The embodiments of the invention in which an exclusive property or privilege is claimed are as follows:

1. In a process for dehydrochlorinating a chlorinated aliphatic hydrocarbon selected from the group consisting of 3,4,-dichloro-1-butene; 2,3,4-trichloro-1-butene; and 1,2,3,4-tetrachlorobutane, by reacting said chlorinated hydrocarbon with an aqueous solution of an alkali metal hydroxide, the improvement of carrying out the process in the presence of from about one to about 15 percent, based on the weight of said chlorinated hydrocarbon, of a cyclic polyether having the structure

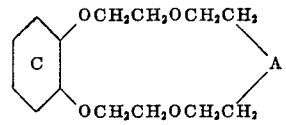

wherein said ring C is selected from benzene, cyclohexane, and lower-alkyl-substituted benzene and cyclohexane rings and A is $$\begin{array}{c} -O \\ \phantom{-}\diagdown \\ \phantom{--}C \\ \phantom{-}\diagup \\ -O \end{array}$$

selected from oxygen and with the proviso that both rings C may be substituted with lower alkyl radicals of one to four carbon atoms.

2. The process of claim 1 wherein the cyclic polyether is 2,3-benzo-1,4,7,10,13-pentaoxacyclopentadec-2-ene.

3. The process of claim 1 wherein the cyclic polyether is 2,5,8,11,14,-pentaoxabicyclo(13.4.0)nonadecane, 4. The process of claim 1 wherein the cyclic polyether is 15-tert-butyl-2,3-benzo-1,4,7,10,13-pentaoxacyclopentadec-2-ene.

5. The process of claim 1 wherein the cyclic polyether catalyst is 17-tert-butyl-2,5,8,11,14-pentaoxabicyclo-(13.4.0)-nonadecane.

6. The process of claim 1 wherein the cyclic polyether catalyst is 2,5,8,15,18,21-hexaoxatricyclo(20.4.0.0$^{9.14}$)-hexacosane.

7. The process of claim 1 wherein said chlorinated compound is 3,4-dichloro-1-butene.

8. The process of claim 10 wherein said dehydrohalogenation is carried out at a temperature of from about 40° to about 85°C.

9. The process of claim 10 wherein the mole ratio of alkali metal hydroxide to 3,4-dichloro-1-butene ranges from about 0.5:1 to 20:1.

* * * * *